(12) United States Patent
Dogterom et al.

(10) Patent No.: US 8,003,564 B2
(45) Date of Patent: Aug. 23, 2011

(54) PROCESS FOR PREPARING A HYDROCARBON SYNTHESIS CATALYST

(75) Inventors: Ronald Jan Dogterom, Amsterdam (NL); Carolus Matthias Anna Maria Mesters, Amsterdam (NL); Marinus Johannes Reynhout, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/097,276

(22) PCT Filed: Dec. 14, 2006

(86) PCT No.: PCT/EP2006/069694
§ 371 (c)(1),
(2), (4) Date: Jun. 13, 2008

(87) PCT Pub. No.: WO2007/068731
PCT Pub. Date: Jun. 21, 2007

(65) Prior Publication Data
US 2008/0306173 A1  Dec. 11, 2008

(30) Foreign Application Priority Data
Dec. 16, 2005  (EP) .................................. 05112323

(51) Int. Cl.
*B01J 23/38* (2006.01)
*B01J 23/70* (2006.01)
*B01J 31/00* (2006.01)

(52) U.S. Cl. ........ 502/325; 502/326; 502/327; 502/150; 502/167; 502/172

(58) Field of Classification Search .................... 502/325
See application file for complete search history.

(56) References Cited

U.S. PATENT DOCUMENTS

| | | | | |
|---|---|---|---|---|
| 4,107,087 A | 8/1978 | Pessimisis | .................... | 252/455 |
| 4,174,301 A | 11/1979 | Choca et al. | ................. | 252/455 |
| 4,239,655 A | 12/1980 | Inoue et al. | ................ | 252/455 Z |
| 4,409,131 A | 10/1983 | Fetchin | ......................... | 502/263 |
| 4,595,703 A | 6/1986 | Payne et al. | .................... | 518/715 |
| 5,248,701 A | 9/1993 | Soled et al. | .................... | 518/700 |
| 5,502,019 A | 3/1996 | Augustine et al. | ............ | 502/314 |
| 5,783,604 A | 7/1998 | Garcia Nunez | ............... | 514/627 |
| 5,783,607 A | 7/1998 | Chaumette et al. | ........... | 518/713 |
| 5,863,856 A | 1/1999 | Mauldin | ....................... | 502/325 |
| 2003/0130361 A1 | 7/2003 | Lednor et al. | ................. | 518/715 |
| 2003/0158271 A1* | 8/2003 | Huisman et al. | .............. | 518/715 |
| 2003/0166451 A1 | 9/2003 | Koveal et al. | ................. | 502/38 |
| 2004/0179994 A1 | 9/2004 | Fenouil et al. | ................ | 423/608 |

FOREIGN PATENT DOCUMENTS

| | | |
|---|---|---|
| CA | 1166655 | 5/1984 |
| EP | 194552 | 9/1986 |
| WO | WO9700231 | 1/1997 |
| WO | WO0176734 | 10/2001 |
| WO | WO2005030680 | 4/2005 |
| WO | WO2006067177 | 6/2006 |

* cited by examiner

*Primary Examiner* — Elizabeth Wood

(57) ABSTRACT

A process for the preparation of a catalyst or catalyst precursor, comprising the steps of: (a) admixing: (i) a catalytically active metal or metal compound (ii) a carrier material (iii) a gluing agent; and (iv) optionally one or more promoters, and/or one or more co-catalysts; (b) forming the mixture of step (a); and (c) drying the product of step (b) for more than 5 hours at a temperature up to 100 C to form the catalyst or catalyst precursor. The catalyst material mixture does not need to be calcined after forming to achieve the required minimum strength for use in a suitable reaction, such as Fischer Tropsch.

9 Claims, 2 Drawing Sheets

PROCESS FOR PREPARING A HYDROCARBON SYNTHESIS CATALYST

PRIORITY CLAIM

The present application claims priority to European Patent Application 05112323.0 filed 16 Dec. 2005.

FIELD OF THE INVENTION

The present invention relates to a process for preparing a catalyst for use in producing normally gaseous, normally liquid and optionally solid hydrocarbons from synthesis gas, generally provided from a hydrocarbonaceous feed, for example a Fischer Tropsch process.

BACKGROUND OF THE INVENTION

Many documents are known describing processes for the catalytic conversion of (gaseous) hydrocarbonaceous feedstocks, especially methane, natural gas and/or associated gas, into liquid products, especially methanol and liquid hydrocarbons, particularly paraffinic hydrocarbons. In this respect often reference is made to remote locations and/or off-shore locations, where no direct use of the gas, e.g. through a pipeline or in the form of liquefied natural gas, is not always practical. This holds even more in the case of relatively small gas production rates and/or fields. Reinjection of gas will add to the costs of oil production, and may, in the case of associated gas, result in undesired effects on the crude oil production. Burning of associated gas has become an undesired option in view of depletion of hydrocarbon sources and air pollution.

The Fischer Tropsch process can be used for the conversion of hydrocarbonaceous feed stocks into liquid and/or solid hydrocarbons. Generally the feed stock (e.g. natural gas, associates gas and/or coal-bed methane, coal) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into paraffinic compounds ranging from methane to high molecular weight modules comprising up to 200 carbon atoms, or, under particular circumstances, even more.

Catalysts used in the Fischer-Tropsch synthesis often comprise a carrier based support material and one or more metals from Group VIII of the Periodic Table, especially from the iron group, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

Catalysts can be prepared by obtaining a metal hydroxide, carefully oxidising it to the metal oxide and then placing it in the appropriate reactor where it is reduced to the metal in situ.

One catalyst or catalyst precursor for Fischer-Tropsch reactions is a shaped catalyst or catalyst precursor comprising cobalt and titania. To prepare the catalyst, cobalt hydroxide (CO(OH)2) can be used as a starting material. This material is usually mixed with one or more co-catalysts, promoters, titania, etc, shaped, for example formed into mm sized particles by means of extrusion, and then calcined. During the calcination $Co_3O_4$ is formed. After calcination the catalyst or catalyst precursor is placed in a Fischer-Tropsch reactor. In the reactor the cobalt compound(s) is (are) reduced to cobalt.

Sometimes a mixture of a catalytically active metal or metal compound and a carrier material, a shaped mixture and a calcined (shaped) mixture are referred to as catalyst precursor or catalyst. Sometimes a shaped mixture and a calcined shaped mixture are referred to as catalyst preformer. In this specification a mixture comprising catalytically active metal or metal compound and carrier material will be referred to as "catalyst or catalyst precursor", irrespective of any shaping or forming, for example spray-drying and especially extrudation, calcination, reduction, and/or any other process step it may have been subjected to.

Hitherto, there has been no consideration of the process for combining and calcining the catalytically active metal and promoter(s) etc. Calcination is carried out at a temperature generally from 350 to 750° C., preferably a temperature in the range of from 450 to 650° C. The effect of the calcination treatment is to remove (crystal) water, to decompose volatile decomposition products and to convert organic and inorganic compounds to their respective oxides.

However, calcination naturally involves some cost both in terms of the process and equipment. Moreover, there is possibly uncontrolled cracking and tension in the shaped catalyst or catalyst precursor which is undesired. There is also the problem of formation of unwanted compounds such as cobalt titanate. All these factors limit the range and types of compounds that can be used in catalyst formation, as well as reducing the activity of the catalyst formed.

WO 2005/030680 indicates that the calcination step is optional in the preparation of a titania comprising catalyst or catalyst precursor wherein at least 50 wt % of the crystalline titania is present as brookite. This document does not elaborate on a process for preparing such a catalyst or catalyst precursor in which the calcination step is omitted.

It is one object of the present invention to improve the process for preparing a catalyst or catalyst precursor.

SUMMARY OF THE INVENTION

Thus, according to one aspect of the present invention, there is provided a process for the preparation of a catalyst or catalyst precursor, comprising the steps of:
(a) admixing:
 (i) a catalytically active metal or metal compound
 (ii) a carrier material
 (iii) a gluing agent; and
 (iv) optionally one or more promoters, and/or one or more co-catalysts;
(b) forming the mixture of step (a); and
(c) drying the product of step (b) for more than 5 hours at a temperature up to 100° C. to form the catalyst or catalyst precursor.

DETAILED DESCRIPTION OF THE INVENTION

Figure 1:
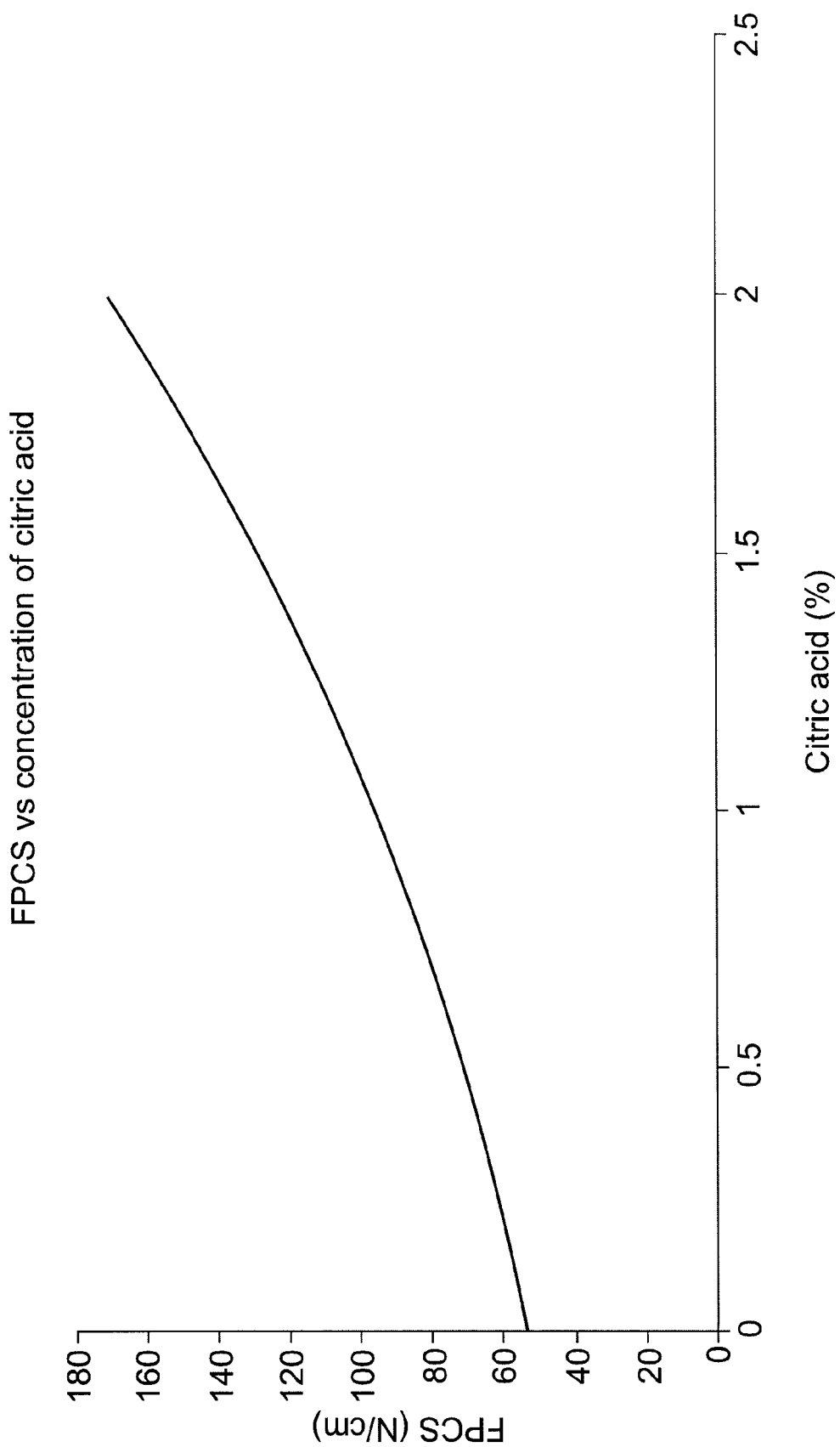
FIG. 1 is a graph of flat plate crushing strength vs. citric acid concentration for a cobalt/titania catalysts.
Figure 2:
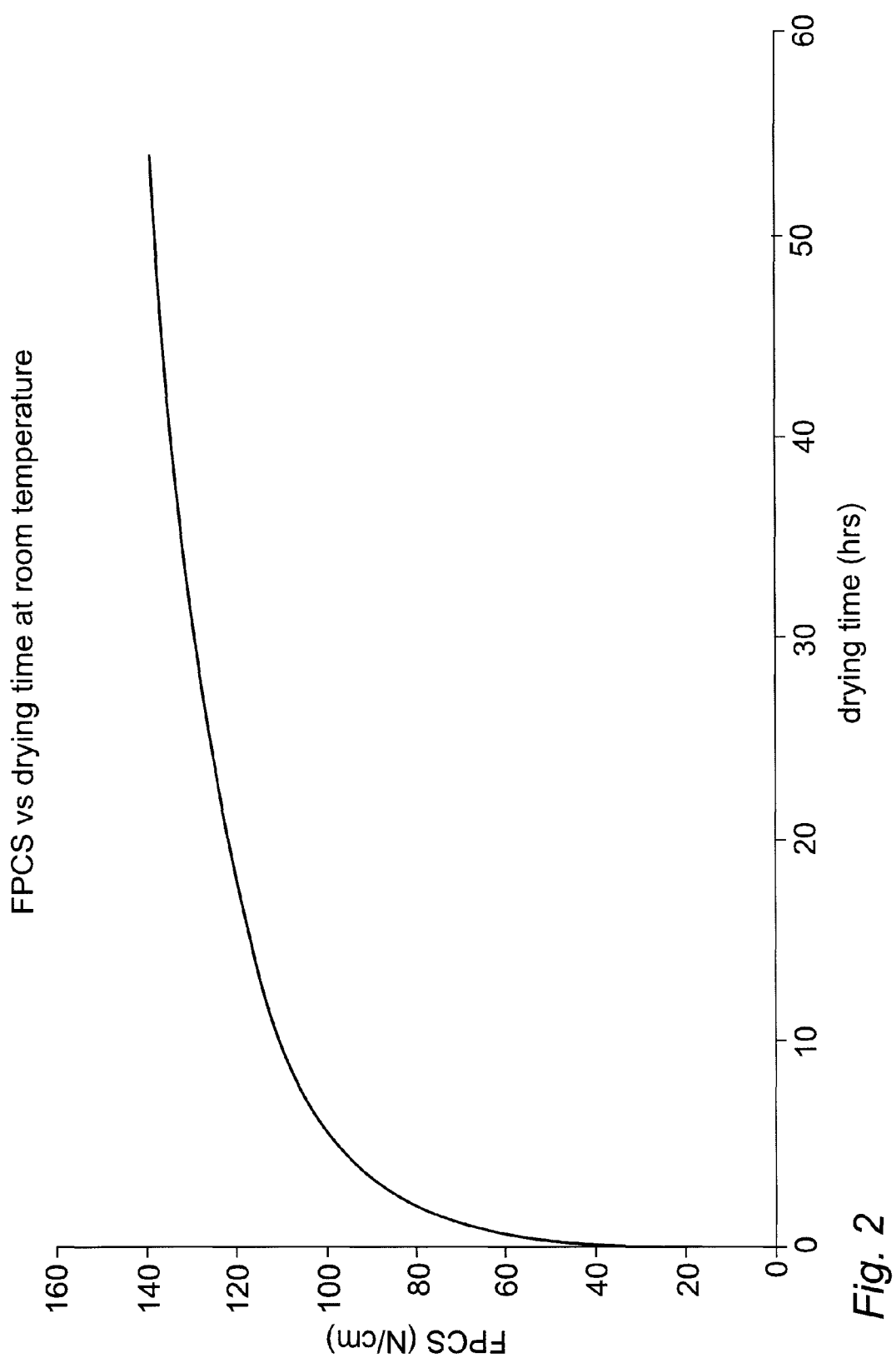
FIG. 2 is a graph of flat plate crushing strength vs. drying time for a cobalt/titania catalyst with 1.5 wt % citric acid.

A co-catalyst is a further catalytically active metal or metal compound. A gluing agent is a basic, neutral, or acidic organic compound that increases the strength of the catalyst or catalyst precursor, which can be confirmed by, for example, attrition tests or flat plate crushing strength measurements. In the forming or shaping step the mixture may for example be spray-dried or extruded, preferably extruded. Preferably the mixture is kneaded before it is formed.

The drying step (c) is not intended to remove all the (crystal) water, but only to remove enough water to make most of the pore volume open. The drying step (c) is performed for more than 5 hours, preferably more than 10 hours, more preferably more than 15 hours, most preferably more than 20 hours. The drying step (c) is performed at a temperature of up to 100° C. The temperature preferably is at least −5° C., more preferably at least 0° C., most preferably at least 10° C. Preferably the drying step (c) is performed at a temperature of up to 60° C., more preferably up to 30° C. Highly preferred is drying for more than 10 hours at a temperature between 10 and 30° C. The relative humidity during the drying step (c) preferably is above 60%, the relative humidity is preferably below 90%, more preferably below 80%.

Remarkably, the present invention has found that the catalyst material mixture does not need to be calcined after forming to achieve the required minimum strength for use in a suitable reaction, usually in a reactor, but can be simply dried over time. The action of drying at a relatively low temperature for a relatively long period of time is similar to the curing of fresh prepared concrete which is based on the hydration of the cement to provide the strength gain of the concrete over time. The hydration process results in progressive stiffening, hardening and strength development, and includes 'curing'. The gluing agent provides the formed catalyst material with the same development in mechanical properties over time.

Flat plate crushing strength is generally regarded as a test method to measure strength at which catalyst particles collapse. A strength of about 70 N/cm is generally regarded as the minimum strength required for a catalyst material to be used in chemical reactions such as hydrocarbon synthesis, preferably at least 74 N/cm, more preferably at least 100 N/cm, most preferably at least 120 N/cm. The strength can be related to the compressive strength of concrete being tested in a similar test method (i.e. 10 cm cubed sample between plates), but then on a larger scale.

Currently, there is no national or international standard test or ASTM for flat plate crushing strength. However, the "compression test" for concrete, used to measure compressive strength, is well known in the art. Furthermore the general shapes of catalysts or catalyst precursors, for example the shape of extrudates such as cylinders or 'trilobes', are well known. The flat plate crushing test strength is independent of product quality in terms of performance in a catalytic reaction.

Naturally, any comparison of flat plate crushing strength must be made between equivalently shaped particles. Usually, it is made between the "top" and "bottom" sides of particles. Where the particles are regularly shaped such as squares, it is relatively easy to conduct the strength tests and make direct comparison. It is known in the art how to make comparisons where the shapes are not so regular, e.g. by using flat plate crushing strength tests. It is generally intended by the present invention to provide a catalyst or catalyst precursor which has the same or higher flat plate crushing strength as the same type of catalyst or catalyst precursor which was previously calcined.

The gluing agent is a basic, neutral, or acidic organic compound that increases the strength of the catalyst or catalyst precursor, which can be confirmed by, for example, attrition tests or flat plate crushing strength measurements.

Examples of suitable basic and neutral compounds are ammonia, ammonia-releasing compounds, ammonium compounds, amino acids, and quaternary ammonium hydroxides.

Examples of suitable acidic compounds include carboxylic acid, being either a mono-carboxylic, di-carboxylic or tri-carboxylic acid. Carboxylic acid derivatives may also be used. Optionally, other functional groups may be present in the carbon chains, such as aldehyde or amino groups. Poly-carboxylic acids may also be used.

The gluing agent preferably is L-aspartic acid, acetic acid, formic acid, citric acid, oxalic acid and/or propionic acid, preferably citric acid.

The gluing agent may act as peptising agent when it is combined with a titania carrier. In case a mixture comprising titania and a gluing agent is extruded, the gluing agent acts as peptising agent in the extrusion step, and acts as gluing agent during the drying step of the extrudate.

The gluing agent may be provided in any amount suitable, which can be calculated by the skilled men for different catalyst materials and additional components. In one embodiment, the amount of gluing agent added is at least 0.25 wt %, preferably at least 0.5 wt % of the mixture or greater, calculated on dried shaped mixture. The amount of gluing agent preferably is up to 10 wt %, more preferably up to 5 wt %, most preferably 1 to 2 wt %, calculated on dried shaped mixture, i.e calculated on the product of step (b). The amount of gluing agent influences the strength of the catalyst or catalyst precursor, which can be confirmed by tests such as analysing attrition, and flat plate crushing strength.

The drying step can be carried out at ambient temperature. Some degree of heating could be used, possibly up to 100° C., preferably in combination with higher humidity or higher amount of water in the surrounding air, but such heating is clearly less than the usual minimum calcining temperature of 350° C.

The present invention avoids the need for the expensive calcination procedure whilst still providing a catalyst or catalyst precursor which is sufficiently strong to remain in size and shape when loaded into a large sized reactor tube. Moreover, the uncalcined catalyst or catalyst precursor has been found to possess more elasticity than calcined catalysts or catalyst precursors based on bar tests. With greater elasticity, such catalysts or catalyst precursors are better able to bear transportation, handling, loading into a reactor, and possible fixing to a substrate. They are also better able to accommodate the subsequent differential of thermoexpansion between the carrier material and the catalytically active metal or metal compound, for example between cobalt and titania, as well as between the carrier material and a metal support, for example between titania and a metal support.

These factors are very important in relation to the time and expense of preparing, loading and activating catalyst material. Brittle catalyst or catalyst precursor, when prepared, stored, transported, and loaded, can clearly break and fall apart. If the catalyst or catalyst precursor has more elasticity, it is able to accept greater deformation in use, and therefore absorb more pressure changes across a wider area of catalyst than before, again leading to less possible breakage or attrition either during loading, activation or use. This relaxes the pressure on each individual catalyst or catalyst precursor particle.

Moreover, the attrition index, which is a measure for the resistance to attrition, of the catalyst or catalyst precursor prepared by the present invention has been found to be greater than the attrition index of calcined catalyst precursors. Consequently, during catalyst handling, transport and reactor loading, fewer fines are made and there is less wastage and less pressure build up when the catalyst is loaded in long reactor tubes. Preferably the drying step (c) is carried out until the attrition index is greater than 95%, preferably greater than 97.1%.

The attrition index of a slurry can be determined as follows.

The two parameters that are used to define resistance against attrition are Average Particle Diameter (APD) and fr<10. APD is measured as the volume weighted average particle diameter, D(4,3), or the De Broucker mean. Fr<10 is the volume fraction of particles having a diameter of <10 µm.

The attrition as used herein is defined as the percent decrease in APD during a test. In addition the attrition rate is further defined as the absolute increase in the amount of particles having a diameter of less than 10 µm, the 'fr<10'. The latter parameter gives additional and important information on the amount of so-called "fines" that may be formed during a test. Fines are detrimental to process operations in slurry as they may clog the filters which are used for catalyst/product separation in slurry operation.

The APD is defined as:

$$\Delta(APD) = \frac{APD_{t=0} - APD_{t=30}}{APD_{t=0}} * 100 (\%)$$

The increase in fr<10 is defined as $$\Delta(fr<10) = [fr<10]_{t=30} - [fr<10]_{t=0}$$

In order to determine the repeatability of the test a series of tests was carried out. Repeatability is defined as: a value below which the absolute difference between two test results obtained with the same method on identical test material under the same conditions may be expected to lie with a specified probability. In the absence of other information, the confidence level is 95%. The relative standard deviations, for both parameters, are less than 5%.

The test also needs to be reliable over longer periods of time, i.e. the equipment should not show any signs of wearing down and attrition rate should remain constant. In order to verify that this is the case, a reference catalyst has been tested regularly, i.e. each (series of) test(s) was preceded by a reference test.

All catalysts are tested at 5% v/v concentration, i.e. the volume-based concentration, which is calculated using the following equation:

$$\% \, v/v = \frac{Mcat}{Mcat[1 - PV*PAD] + [M1/dL]*PAD} * 100$$

Where Mcat is the mass of catalyst, ML is the mass of the liquid, dL is the density of the liquid, PV is the pore volume of the catalyst (in ml/g, measured manually by adding small amounts of water to a known mass of catalyst until wetness occurs), and PAD is the particle density of the catalyst, calculated from PV and the skeletal density, SKD, of the catalyst:

$$PAD = \frac{1}{(1/SKD) + PV} \, (g/ml)$$

$$SKD = \Sigma MFi * di \, (g/ml)$$

The above test is reliable, simple, quick and efficient, being conveniently performed in water as the liquid medium at a temperature of 20° C. The test mimics the shear conditions occurring in a commercial process (pump loop, stirrers, other internals) by exposing the catalyst particles to a high shear mixer/disperser for a specified period of time. The change in the particle size distribution of the catalyst is a measure of its strength or its attrition resistance. The test can be conducted with an estimated repeatability of better than ±5%.

The attrition index of extrudates can be determined as follows.

The catalyst material can be rotated within a (simple) drum with one internal baffle plate, over a standard number of drum rotations. The loss of material can then be determined as the change in weight of material below 0.84 mm, judged as being "fines". Fines are detrimental to process operations as they may clog the filters used. Fines can also create a large pressure build up in long tubular reactors.

One particular advantage of the present invention is the ability to use or create low temperature stable cobalt compounds such as Co(OH)2 and/or CoOOH, and the surprising finding that such compounds are sufficient for the creation of an active catalyst material. Hitherto, it has been believed that cobalt compounds formed after high temperature treatment such as the spinal Co3O4 must be provided in a very high or 100% amount in order to provide the right form of cobalt for subsequent activation and use. The present invention has found that this is not such an absolute requirement as previously considered.

General methods of preparing catalysts or catalyst precursors are known in the art, see for example U.S. Pat. No. 4,409,131, U.S. Pat. No. 5,783,607, U.S. Pat. No. 5,502,019, WO 0176734, CA 1166655, U.S. Pat. No. 5,863,856 and U.S. Pat. No. 5,783,604. These include preparation by co-precipitation and impregnation. Such processes could also include freezing, sudden temperature changing, etc. Control of the component ratio in the solid solution can be provided by parameters such as residence time, temperature control, concentration of each component, etc.

The catalytically active metal or metal compound, may be present with one or more metals or metal oxides as promoters, more particularly one or more d-metals or d-metal oxides.

Suitable metal oxide promoters may be selected from Groups IIA, IIIB, IVB, VB, VIB, VIIB and VIIIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters.

References to "Groups" and the Periodic Table as used herein relate to the previous IUPAC version of the Periodic Table of Elements such as that described in the 68th Edition of the Handbook of Chemistry and Physics (CPC Press).

Suitable metal promoters may be selected from Groups VIIB or VIII of the (same) Periodic Table. Manganese, iron, rhenium and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier.

The catalytically active metal or metal compound could also be present with one or more co-catalysts. Suitable co-catalysts include one or more metals such as iron, nickel, or one or more noble metals from Group VIII. Preferred noble metals are platinum, palladium, rhodium, ruthenium, iridium and osmium. Most preferred co-catalysts for use in the hydrocracking are those comprising platinum. Such co-catalysts are usually present in small amounts.

A most suitable catalyst or catalyst precursor comprises cobalt as the catalytically active metal and zirconium as a promoter. Another most suitable catalyst or catalyst precursor comprises cobalt as the catalytically active metal and manganese and/or vanadium as a promoter.

Any promoter(s) are typically present in an amount of from 0.1 to 60 parts by weight per 100 parts by weight of any carrier material used. It will however be appreciated that the optimum amount of promoter(s) may vary for the respective elements which act as promoter(s). If the catalyst or catalyst precursor comprises cobalt as the catalytically active metal and manganese and/or vanadium as promoter, the cobalt:(manganese+vanadium) atomic ratio is advantageously at least between 5:1 and 30:1.

In one embodiment of the present invention, the catalyst or catalyst precursor comprises the promoter(s) and/or co-catalyst(s) having a concentration in the Group VIII metal(s) in the range 1-10 atom %, preferably 3-7 atom %, and more preferably 4-6 atom %.

In another embodiment of the present invention, the catalytically active metal or metal compound is in the form of a hydroxide, carbonate, oxyhydroxide or oxide, preferably hydroxide.

The catalytically active metal or metal compound is preferably supported on a porous carrier material, which can be added prior to forming or shaping. The porous carrier material may be selected from any of the suitable refractory metal oxides or silicates or combinations thereof known in the art. Particular examples of preferred porous carriers include silica, alumina, titania, zirconia, ceria, gallia and mixtures thereof, especially silica and titania.

The optimum amount of catalytically active metal present on a carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The carrier and catalyst material could be admixed in any form or way known, and then formed or shaped, for example by spray drying or extrusion, preferably extrusion. Preferably the catalyst material and any promoter(s), carrier material and co-catalyst(s) are dispersed and co-mulled together prior to forming or shaping.

In a preferred embodiment, a liquid is added to the mixture as part of the process of the present invention. Preferably the liquid is added to the mixture after admixing and before or during forming such as extrusion.

The liquid may be any of suitable liquids known in the art, for example: water; ammonia; alcohols, such as methanol, ethanol and propanol; ketones, such as acetone; aldehydes, such as propanol and aromatic solvents, such as toluene, and mixtures of the aforesaid liquids. A most convenient and preferred liquid is water.

The liquid may include viscosity improvers such as polyvinylalcohol solutions.

The drying step (c) may be carried out in a controlled atmosphere in order to control the rate of evaporation of volatile material such as the solvent used, which solvent is generally water. Preferably, the rate of evaporation of the solvent is controlled. This control is provided by the control of any heat used, air circulation, type of heat supply, the thickness of the catalyst material, etc. Preferably, the time for drying is longer than any previous drying action, step or period used, in order to provide the build up of strength over time in the same way as the strength is formed over time in concrete formation. Generally, this involves the evaporation of the solvent, usually water, over time. Sometimes or at times, the evaporation rate is not regular, but it is known that extending the period of time over at least a number of days, sometimes weeks, for drying, will generally increase the strength of concrete.

After drying, the resulting catalyst or catalyst precursor may be activated by contacting the catalyst or catalyst precursor with hydrogen or a hydrogen-containing gas, typically at temperatures of about 200 to 350° C.

The present invention extends to the activation of a catalyst or catalyst precursor prepared as herein described, particularly but not exclusively, by decomposition of the metal compound containing the catalytically active metal and/or reduction of the metal compound to its metal form. The invention also extends to a catalyst or catalyst precursor formed thereby.

A catalyst provided by the present invention is particularly, but not exclusively, useful for a hydrocarbon synthesis process such as a Fischer Tropsch reaction. Fischer-Tropsch catalysts are known in the art, and as a Group VIII metal component, they preferably use cobalt, iron and/or ruthenium, more preferably cobalt.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 180 to 270° C. Typical total pressures for the catalytic conversion process are in the range of from 1 to 200 bar absolute, more preferably from 10 to 70 bar absolute. In the catalytic conversion process mainly $C_5+$ hydrocarbons are formed, based on the total weight of hydrocarbonaceous products formed, (at least 70 wt %, preferably 90 wt %).

According to a second aspect of the present invention, there is provided a process for producing normally gaseous, normally liquid and optionally normally solid hydrocarbons from synthesis gas which comprises the steps of:

(i) providing the synthesis gas; and
(ii) catalytically converting the synthesis gas of step (i) at an elevated temperature and pressure to obtain the normally gaseous, normally liquid and optionally normally solid hydrocarbons;

wherein the catalyst for step (ii) is prepared as herein described.

The present invention also provides a process further comprising:

(iii) catalytically hydrocracking higher boiling range paraffinic hydrocarbons produced in step (ii), as well as hydrocarbons whenever provided by a process as described herein.

The present invention also provides use of a catalyst or catalyst precursor as defined herein in a process for producing normally gaseous, normally liquid and optionally normally solid hydrocarbons from synthesis gas which comprises the steps of:

(i) providing the synthesis gas; and
(ii) catalytically converting the synthesis gas of step (i) at an elevated temperature and pressure to obtain the normally gaseous, normally liquid and optionally normally solid hydrocarbons.

Fischer-Tropsch synthesis is preferably carried out at a temperature in the range from 125 to 350° C., more preferably 175 to 275° C., most preferably 180° C. to 260° C. The pressure preferably ranges from 5 to 150 bar abs., more preferably from 5 to 80 bar abs.

Preferably, a Fischer-Tropsch catalyst is used, which yields substantial quantities of paraffins, more preferably substantially unbranched paraffins. A part may boil above the boiling point range of the so-called middle distillates, to normally solid hydrocarbons. A most suitable catalyst for this purpose is a cobalt-containing Fischer-Tropsch catalyst. The term "middle distillates", as used herein, is a reference to hydrocarbon mixtures of which the boiling point range corresponds substantially to that of kerosene and gas oil fractions obtained in a conventional atmospheric distillation of crude mineral oil. The boiling point range of middle distillates generally lies within the range of about 150 to about 360° C.

The higher boiling range paraffinic hydrocarbons if present, may be isolated and subjected to a catalytic hydrocracking step, which is known per se in the art, to yield the desired middle distillates. The catalytic hydrocracking is carried out by contacting the paraffinic hydrocarbons at elevated temperature and pressure and in the presence of hydrogen with a catalyst containing one or more metals having hydrogenation activity, and supported on a carrier. Suitable hydrocracking catalysts include catalysts comprising metals selected from Groups VIB and VIII of the (same) Periodic Table of Elements. Preferably, the hydrocracking catalysts contain one or more noble metals from Group VIII. Preferred noble metals are platinum, palladium, rhodium, ruthenium, iridium, and osmium. Most preferred catalysts for use in the hydrocracking stage are those comprising platinum.

The amount of catalytically active metal present in the hydrocracking catalyst may vary within wide limits and is typically in the range of from about 0.05 to about 5 parts by weight per 100 parts by weight of the carrier material. Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The process may be operated in a single pass mode ("once through") or in a recycle mode. Slurry bed reactors, ebulliating bed reactors and fixed bed reactors may be used, the fixed bed reactor being the preferred option.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired.

The off gas of the hydrocarbon synthesis may comprise normally gaseous hydrocarbons produced in the synthesis process, nitrogen, unconverted methane and other feedstock hydrocarbons, unconverted carbon monoxide, carbon dioxide, hydrogen and water. The normally gaseous hydrocarbons are suitably $C_{1-5}$ hydrocarbons, preferably $C_{1-4}$ hydrocarbons, more preferably $C_{1-3}$ hydrocarbons. These hydrocarbons, or mixtures thereof, are gaseous at temperatures of 5-30° C. (1 bar), especially at 20° C. (1 bar). Further, oxygenated compounds, e.g. methanol, dimethyl ether, may be present in the off gas. The off gas may be utilized for the production of electrical power, in an expanding/combustion process such as in a gas turbine described herein, or recycled to the process. The energy generated in the process may be used for own use or for export to local customers. Part of an energy could be used for the compression of the oxygen containing gas.

The process as just described may be combined with all possible embodiments as described in this specification.

Any percentage mentioned in this description is calculated on total weight or volume of the composition, unless indicated differently. When not mentioned, percentages are considered to be weight percentages. Pressures are indicated in bar absolute, unless indicated differently.

EXPERIMENTAL

A Fischer Tropsch catalyst composition was prepared using cobalt hydroxide, titania and standard extrusion aids. The mixture comprised about 2 wt % citric acid. A reference catalyst or catalyst precursor, was prepared from this composition. The composition was extruded and then calcined.

A Fischer Tropsch catalyst composition was prepared using cobalt hydroxide, titania and standard extrusion aids. The mixture comprised about 2 wt % citric acid. A catalyst or catalyst precursor according to the invention was prepared from this composition. The composition used for the reference catalyst described above and this composition, which was used for the catalyst according to the invention, contained the same ingredients in the same amounts. The composition was dried at room temperature for 96 hours, in order to prepare a catalyst or catalyst precursor according to the invention.

Each catalyst was put in a reactor and subsequently reduced in the same manner.

Table 1 shows the properties of each catalyst with respect to attrition and with respect to the activity and the $C_{5+}$ selectivity in a Fischer Tropsch reaction.

TABLE 1

| P = 35-37 bar<br>T = 229° C.<br>GHSV = 2400 Nl/l cat.hr<br>Runhours 210-240 | Activity<br>(STY)<br>(g wax/l<br>cat · hr) | Selectivity<br>($C_{5+}$)<br>(%) | Attrition<br>Index<br>(%) |
|---|---|---|---|
| Reference Catalyst | 287 | 88.2 | 97% |
| Catalyst according to invention | 291 | 89.2 | 97.7% |

Thus, use of the catalyst according to the present invention has similar activity and provides a slightly higher $C_{5+}$ selectivity, and performs better in the attrition test.

FIG. (1) shows an illustration in the change in flat plate crushing strength (FPCS) of a cobalt/titania catalyst or catalyst precursor according to the present invention based on the change of amount of citric acid. Naturally, other materials and other processing conditions will provide different figures. The catalyst or catalyst precursor in FIG. 1 was prepared by mixing cobalt hydroxide, titania, and different amounts of citric acid, extruding this mixture, and drying the extrudate, without any calcination. It can be noted that the FPCS figure is high, especially for the higher concentrations of citric acid, which strength is very suitable for use of a catalyst material in a reactor.

With respect to the attrition test, this was carried out by rotation of the catalyst material within a simple drum with one internal baffle plate, over a standard number of drum rotations. The loss of material was measured as the change in weight of material below 0.84 mm, judged as being "fines". The prior art catalyst showed a 3% creation of fines, but the catalyst without calcination reduced the fines to 2.33%, i.e. a reduction of over 22%. This is a significant reduction in the number of fines, indicating the strength of the catalyst material according to the present invention. It provides a significant reduction of catalyst attrition in a reactor.

Another Fishcher Tropsch catalyst composition was prepared using cobalt hydroxide, titania and standard extrusion aids. The mixture comprised about 1.8 wt % citric acid. The mixture was divided in two.

One part, the reference catalyst or catalyst precursor, was extruded and then calcined. The other part was dried at room temperature for 24 hours, in order to prepare a catalyst or catalyst precursor according to the invention. Table 2 shows the properties of each catalyst with respect to attrition.

TABLE 2

|  | Attrition Index (%) |
|---|---|
| Reference Catalyst | 95.4% |
| Catalyst according to invention | 97.2% |

The reference catalyst or catalyst precursor showed a 4.6% creation of fines, but the catalyst according to the invention showed a 2.8% creation of fines, i.e. a reduction of 39%. This reduction in number of fines indicates the strength of the catalyst material according to the present invention.

FIG. (2) shows a graph of the variation of flat plate crushing strength over drying time based on the use of 1.5 wt % citric acid in the same standard catalyst cobalt and titania combination. As can be seen, the FPCS rapidly increases in the first few hours, but then continues to increase over time in the same manner as concrete strength.

What is claimed is:

1. A process for the preparation of a Fischer-Tropsch catalyst or catalyst precursor, comprising the steps of:
   (a) admixing:
      (i) a catalytically active metal or metal compound with cobalt, iron and/or ruthenium as catalytically active metal;
      (ii) a carrier material, said carrier material being a refractory metal oxide;
      (iii) a liquid selected from the group consisting of water, ammonia, alcohols, ketones, aldehydes, aromatic solvents, and mixtures of the aforesaid liquids;
      (iv) a gluing agent selected from the group consisting of ammonia, ammonia-releasing compounds, ammonium compounds, amino acids, quaternary ammonium hydroxides, a carboxylic acid, a carboxylic acid derivative, a poly-carboxylic acid, and mixtures thereof, all optionally with other functional groups being present in the carbon chains; and
      (v) optionally one or more promoters, and/or one or more co-catalysts;
   (b) forming the mixture of step (a); and
   (c) drying the product of step (b) for more than 15 hours, at a temperature up to 30° C. to form the catalyst or catalyst precursor and not calcining the catalyst or catalyst precursor.

2. A process as claimed in claim 1 wherein the liquid is water.

3. A process as claimed in claim 1 wherein a catalyst is prepared with cobalt as catalytically active metal, the amount of cobalt present in the catalyst ranging from 1 to 100 parts by weight per 100 parts by weight of carrier material.

4. A process as claimed in claim 1 wherein the carrier material is selected from the group consisting of silica, alumina, titania, zirconia, ceria, gallia and mixtures thereof.

5. A process as claimed in claim 1 wherein the gluing agent is selected from the group consisting of L-aspartic acid, acetic acid, formic acid, citric acid, oxalic acid and propionic acid.

6. A process as claimed in claim 1 wherein the forming in step (b) is extrusion.

7. A process as claimed in claim 1 wherein the drying step (c) is carried out until the flat plate crushing strength is greater than 70 N/cm.

8. A process as claimed in claim 1 wherein the drying step (c) is carried out at a temperature of at least −5° C.

9. A catalyst or catalyst precursor prepared by a process as defined in claim 1.

* * * * *